(12) United States Patent
Bomart et al.

(10) Patent No.: US 11,409,002 B2
(45) Date of Patent: Aug. 9, 2022

(54) METHOD FOR OPERATING A PLURALITY OF GNSS RECEIVERS FOR DETECTING SATELLITE SIGNAL DEFORMATION

(71) Applicant: Thales Management & Services Deutschland GmbH, Ditzingen (DE)

(72) Inventors: Sébastien Bomart, Strasbourg (FR); André Schüttpelz, Sachsenheim (DE); Arberita Kusari, Stuttgart (DE); Frieder Beck, Kirchheim unter Teck (DE); Ulrich Kälberer, Stuttgart (DE)

(73) Assignee: THALES MANAGEMENT & SERVICES DEUTSCHLAND GMBH, Ditzingen (DE)

( * ) Notice: Subject to any disclaimer, the term of this patent is extended or adjusted under 35 U.S.C. 154(b) by 531 days.

(21) Appl. No.: 16/530,349

(22) Filed: Aug. 2, 2019

(65) Prior Publication Data
US 2020/0049831 A1    Feb. 13, 2020

(30) Foreign Application Priority Data
Aug. 8, 2018   (EP) .................................. 18188063

(51) Int. Cl.
*G01S 19/08*    (2010.01)

(52) U.S. Cl.
CPC ..................... *G01S 19/08* (2013.01)

(58) Field of Classification Search
CPC .......... G01S 19/08; G01S 19/42; G01S 19/20; G01S 19/23
See application file for complete search history.

(56) References Cited

U.S. PATENT DOCUMENTS 10,324,194 B2 *   6/2019   Schüttpelz .......... H04L 27/2278
2013/0057436 A1   3/2013   Krasner et al.
(Continued)

FOREIGN PATENT DOCUMENTS

| EP | 1 727 307 A1 | 11/2006 |
| EP | 1 729 145 A1 | 12/2006 |
| EP | 1 332 378 B1 | 9/2012 |

OTHER PUBLICATIONS

ICAO Annex 10 to the Convention on International Civil Aviation—Aeronautical Telecommunications, vol. I, Radio Navigation Aids (including Amendment 89); 999 University Street, Montréal, Quebec, Canada H3C 5H7, Nov. 2012.
(Continued)

*Primary Examiner* — Julio R Perez
(74) *Attorney, Agent, or Firm* — Hackler Daghighian Martino & Novak

(57) ABSTRACT

A test metric for satellite sent GNSS code signals is proposed, wherein a signal sent by each satellite i is received at different GNSS receivers, and bias-removed, averaged over the receivers and normalized measurement values are derived out of autocorrelation function values. A correlation matrix $R_{i,n}$ is built from a matrix $X_{i,n}$ containing the measurement values in the form of measurement value vectors $\vec{X}_{i,k}$ from the present time epoch $t_n$ and from previous time epochs $t_k$ with $k=1,\ldots,n-1$, wherein a principal component analysis is done of matrix $R_{i,n}$, wherein a transformed vector $\vec{T}_{i,n} = PC_{i,n}^T \cdot \vec{X}_{i,n}^T$ is calculated, with $PC_{i,n}$ containing at least two eigenvectors having the largest eigenvalues of all eigenpairs. A signal quality monitor test metric $SQM_{i,n}$ is built from the square sum of the entries of transformed vector $\vec{T}_{i,n}$, and if $SQM_{i,n}$ is larger than a threshold THR, the
(Continued)

satellite signals are disallowed for position determination at all GNSS receivers.

19 Claims, 3 Drawing Sheets

(56) References Cited

U.S. PATENT DOCUMENTS

| | | | | |
|---|---|---|---|---|
| 2014/0070987 A1* | 3/2014 | Jarvis | ................... | G01S 19/24 342/357.21 |
| 2015/0085899 A1* | 3/2015 | Raghupathy | ............ | G01S 19/45 375/142 |
| 2015/0091754 A1* | 4/2015 | Komaili | ............... | H04B 1/7085 342/357.69 |
| 2018/0329072 A1* | 11/2018 | Anderson | ............... | G01S 19/30 |
| 2020/0049831 A1* | 2/2020 | Bomart | ................... | G01S 19/20 |
| 2022/0066048 A1* | 3/2022 | Diggelen | .............. | G01S 19/396 |

OTHER PUBLICATIONS

D.M. Akos, R.E. Phelts, A. Mitelman, S Pullen, and P. Enge; "GPS-SPS Signal Quality Monitoring (SQM)," Position, Location and Navigation Symposium, Conference Proceedings Addendum, 2000 IEEE, San Diego, CA, Mar. 2000.

A.M. Mitelman, R.E. Phelts, D.M. Akos, S.P. Pullen, and P.K. Enge; "Signal Deformations on Nominally Healthy GPS Satellites," Proceedings of the 2004 National Technical Meeting of the Institute of Navigation, San Diego, CA, Jan. 2004, pp. 0-0.

R.E. Phelts, D. Akos, P. Enge, "Robust Signal Quality Monitoring and Detection of Evil Waveforms," Proceedings of ION GPS 2000, Salt Lake City, UT., Sep. 19-22, 2000, pp. 1180-1190.

Phelts, R. Eric, "Toward Real-Time SQM for WAAS: Improved Detection Techniques", Proc. ION GPS/GNSS 2003, Sep. 9-12, 2003, Portland, OR, pp. 2739-2749.

F. Liu, M. Brenner, C.Y. Tant, "Signal Deformation Monitoring Scheme Implemented in a Prototype Local Area Augmentation System Ground Installation," Proc. ION GNSS 2006, Fort Worth, TX, Sep. 26-29, 2006, pp. 367-380.

G. B. Kaplan, O. Içoglu, A. B. Yoldemir, and M. Sezgin, "Real-time object detection using dynamic principal component analysis," in Proc. XIII Int. Conf. Ground Penetrating Radar, Lecce, Italy, Jun. 2010, pp. 369-374.

J. Rife, Pratap Misra; "Impact of Time-Correlation of Monitor Statistic on Continuity of Safety-Critical Operations" Proceedings of the 24th International Technical Meeting of the Satellite Division of the Institute of Navigation, Portland, OR, Sep. 19-23, 2011, pp. 303-315.

S. J. Qin, W. Li, and H. Yue, "Recursive PCA for adaptive process monitoring", in World Congress of the International Federation of Automatic Control, pp. 85-90, 1999.

J.R. Bunch, C.P. Nielsen, D.C. Sorensen; "Rank one modification of the symmetric eigenproblem", in Numerische Mathematik, vol. 31, pp. 31-48 (1978).

M. Gu and S. Eisenstat, "A stable and efficient algorithm for the rank-one modification of the symmetric eigenproblem". SIAM Journal on Matrix Analysis and Applications, 1994, vol. 15, No. 4, pp. 1266-1276.

Robert Eric Phelts, "Multicorrelator Techniques for Robust Mitigation of Threats to GPS Signal Quality," Ph.D. Thesis, Stanford University Department of Mechanical Engineering, Stanford, California, Jun. 2001.

R. Eric Phelts and Todd Walter, "Practical Signal Quality Monitoring for Augmentation Systems," Standford University Department of Aeronautics and Astronautics, Stanford, California.

Mats Brenner and Fan Liu, "Ranging Source Fault Detection Performance for Category III GBAS," 23rd International Technical Meeting of the Satellite Division of the Institute of Navigation, Portland, Oregon, Sep. 21-24, 2010, pp. 2618-2632.

R. Eric Phelts, Alexander Mitelman, Sam Pullen, Dennis Akos and Per Enge, "Transient Performance Analysis of a Multicorrelator Signal Quality Monitor," Stanford University Department of Aeronautics and Astronautics; Stanford, California.

Alexander Michael Mitelman, "Signal Quality Monitoring for GPS Augmentation Systems," Ph.D. Thesis, Stanford University Department of Electrical Engineering, Stanford, California, Dec. 2004.

Macabiau, Christophe; Chatre, Eric. Impact of evil waveforms on GBAS performance. IEEE Plans 2000, Position Location and Navigation Symposium, Mar. 2000, San Diego, United States, pp. 22-29, 10.1109/PLANS.2000.838279. hal-01021688.

* cited by examiner

METHOD FOR OPERATING A PLURALITY OF GNSS RECEIVERS FOR DETECTING SATELLITE SIGNAL DEFORMATION

CROSS-REFERENCE TO RELATED APPLICATIONS

This application claims priority to European Patent Application EP 18188063.4, filed Aug. 8, 2018, the entire contents of which are hereby incorporated in full by this reference.

DESCRIPTION

Field of the Invention

The invention relates to a method for operating a plurality of GNSS (=Global Navigation Satellite System) receivers, wherein for position determination, the GNSS receivers receive GNSS code signals belonging to signals sent from a multitude of satellites, and wherein each received GNSS code signal is correlated with a reference code signal generated by the receiving GNSS receiver to obtain an autocorrelation function, wherein a multitude of function values of the autocorrelation function at different discrete chip spacings are analyzed and used in obtaining a test metric, wherein using the test metric, a decision is made whether the received GNSS code signals are suitable for position determination or unsuitable for position determination due to satellite signal deformation, and wherein the GNSS code signals found unsuitable for position determination are excluded from position determination. The invention allows monitoring GNSS code signals with respect to satellite signal deformation with an improved integrity and continuity.

Background of the Invention

An apparatus for navigation satellite signal quality monitoring is known from EP 1 332 378 B1, noted also as [AD09].

GNSS (=Global Navigation Satellite System) receivers are used to determine the position of, for example, moving vehicles such as a plane or a ship. A number of satellites orbiting in space regularly send out GNSS code signals, and in a GNSS receiver the received signals are correlated with reference signals (also called replica signals) in order to determine a time delay between the transmission at the respective satellite and the arrival at the GNSS receiver. These time delays may be used to determine distances to the respective satellites, which move on known trajectories, so position information (such as geographical longitude, latitude and height) can be calculated.

Occasionally, a satellite may become defective, such that the GNSS code signal sent by the satellite is deformed (corrupted), i.e. does not have the properties necessary for accurate position determination. The most important types of signal deformations are a signal delay as compared to the correct timing (typically characterized by a delay time $\Delta$), and an analogue ringing superimposed on the signal (typically characterized by a decay coefficient $\sigma$), or combinations of both. If the deformed signals received at a GNSS receiver are used for position determination, position errors may result.

Signal deformation is typically measured using an autocorrelation function, applying a convolution with a replica signal. It should be noted that some small signal deformation is present also in the fault free case, for reasons inherent to the applied (properly working) hardware and the measurement methodology.

If the position determination is safety-critical, such as in aeronautic or railway applications, deformed signals have to be identified quickly, and have to be excluded from position determination.

Signal deformation monitoring is mandated by e.g. ICAO (international civil aviation organization) in GBAS (ground based augmentation system) and SBAS (satellite based augmentation system) for safety-critical differential satellite based navigation systems used in aviation [AD01]. So far, two monitoring methods have been suggested, compare [AD02-AD06].

EP 1 332 378 B1 discloses an apparatus for navigation signal quality monitoring. For a received GNSS code signal, autocorrelation function values $l_i$ are determined for various chip spacings. Then difference values $d_k=l_k-l_{k-1}-\text{E}d_k$ are calculated resulting in a vector $\underline{d}$, with E being an expectation value, and a covariance matrix $P=E[(\underline{d}-\underline{m})(\underline{d}-\underline{m})^T]$ is calculated, and $\underline{m}$ being the mean vector of $\underline{d}$. Then the diagonal matrix $\tilde{D}$ is calculated for $P$, using Cholesky factorization, for obtaining variances of $\tilde{\sigma}_i^2$. A fault value $$d[\chi^2] = \sum_{i=1}^{n} \frac{\tilde{d}_i^2}{\tilde{\sigma}_i^2}$$

is then calculated, which may be compared to a threshold in order to determine the existence of a fault.

The difficulty in monitoring GNSS code signals for detecting satellite signal deformation is on the one hand to reliably identify satellite faults ("integrity"), and on the other hand, not to unnecessarily exclude a satellite working fine ("continuity"). Further, the monitoring procedure should have a time-to-alert short enough to exclude defect satellites before a dangerous situation can manifest.

[AD07] deals with principal component analysis (PCA) as a detection methodology for ground penetrating radar. [RD01] gives a general description of recursive PCA. [AD08] describes the use of pre-thresholds in monitor statistic.

Object of the invention

It is the object of the present invention to provide a method for operating GNSS receivers, which allows monitoring GNSS code signals with an improved integrity and continuity.

SUMMARY OF THE INVENTION

Short Description of the Invention

This object is achieved, in accordance with the invention, by a method as introduced in the beginning, wherein for each satellite i, with i being a satellite index, using the test metric includes the following steps:

a) for each time epoch $t_k$ in which the GNSS receivers receive GNSS code signals belonging to the signal of the same carrier frequency sent from the satellite i, forming a vector $\vec{X}_{i,k}$ of measurement values $X_{m,i,k}$, with m being a chip spacing index, and k being a measurement time epoch index, and the respective measurement value $X_{m,i,k}$ being derived from normalized and bias-removed function values of the autocorrelation functions of the GNSS code signals received at the GNSS receivers, combined for a multitude of the GNSS receivers;

b) obtaining the correlation matrix $R_{i,n}$ at time epoch $t_n$ from the epoch-wise measurement value vectors $\vec{X}_{i,k}$ obtained over a plurality of n time epochs $t_k$ with k=1, ..., n, with n being a monitoring time epoch index, which results in matrix $$X_{i,n} = \begin{bmatrix} \vec{X}_{i,1} \\ \vdots \\ \vec{X}_{i,n} \end{bmatrix},$$

in particular with $R_{i,n} \sim X^T_{i,n} X_{i,n}$ with $X^T_{i,n}$ being the transpose matrix of $X_{i,n}$, c) doing a principal component analysis on correlation matrix $R_{i,n}$, thus obtaining an eigendecomposition of matrix $R_{i,n}$ into a multitude of eigenpairs, namely pairs of eigenvector and eigenvalue, d) calculating for time epoch $t_n$ a signal quality monitor test metric $SQM_{i,n}$ by transforming vector $\vec{X}_{i,n}$ to vector $\vec{T}_{i,n}$ via multiplication with principal component matrix $PC_{i,n}$ and forming the square sum of vector $\vec{T}_{i,n}$'s entries, wherein $PC_{i,n}$ contains at least two eigenvectors of $R_{i,n}$, with the eigenvectors chosen having the largest eigenvalues of all eigenpairs, e) comparing $SQM_{i,n}$ to a predefined threshold value THR, and if $SQM_{i,n}$ exceeds THR, the entirety of GNSS code signals received at all GNSS receivers belonging to the signal of the same carrier frequency sent by satellite i in time epoch $t_n$ are considered unsuitable for position determination due to satellite signal deformation, wherein for subsequent time epochs having passed, the signal quality monitor test metric $SQM_{i,n}$ is determined again, with n increasing by 1 for each time epoch having passed.

The present invention proposes to base a test metric on a principal component analysis (PCA), see step c), applied on a correlation matrix $R_{i,n}$, see step b), obtained from bias removed and normalized function values of the autocorrelation function of the GNSS code signals received at the GNSS receivers from the same satellite i at the same carrier frequency, compare step a).

In step a), in order to increase reliability of the method, the measurement values $X_{m,i,k}$ each contain information from a multitude (typically all) of the GNSS receivers (or their respective received GNSS code signals) for a particular chip spacing index value m; the respective function values from the GNSS receivers are used in a combination (such as averaged). By this means, any receiver-specific error effects like uncorrelated noise or potentially corrupt signal observations resulting from a defect of a single receiver are attenuated, and signal deformations resulting from a satellite defect are kept pronounced.

The principal component analysis may increase the response to signal deformation, i.e. the recognizability of deformations is increased, in particular for deformations originating from satellite defects. For this purpose, according to the invention, the principal component matrix $PC_{i,n}$ includes the eigenvectors of at least the two largest eigenvalues (and probably more) of all eigenpairs. In step d), in the principal component matrix $PC_{i,n}$, the eigenvectors are typically in sorted order from largest to smallest based on the size of their corresponding eigenvalues. Sorting may help to identify the largest eigenvalues and corresponding eigenvectors in case not all eigenvectors are to be taken into account.

The principal component analysis is used for constructing the signal quality test metric $SQM_{i,n}$, see step d), which is used for comparison to a threshold value THR for deciding on an exclusion of satellite i, compare step e). The signal quality test metric $SQM_{i,n}$ is based not only on information from the most recent (monitoring) time epoch $t_n$, but also includes information from previous time epochs, which helps to identify satellite defects. Satellite defects typically lead to signal distortions for all GNSS code signals sent by the respective satellite after the defect has manifested, whereas distortions occurring only in an isolated (measurement) time epoch $t_k$ typically do not originate from a satellite defect (but e.g. from thermal noise). Note that index n refers to the most recent time epoch, i.e. the monitoring time epoch, whereas index k refers to the observation time epochs in general (and often previous/past time epochs).

The inventive method may be performed in "real time", i.e. continuously during operation of the GNSS receivers, so a particularly quick response to newly occurring satellite defects is provided. Real time application typically includes a recursive calculation of the eigendecomposition of $R_{i,n}$. The method is particularly suitable for recursive calculation, since it takes up information from previous time epochs again anyway.

The method typically uses at least 2 GNSS receivers, preferably at least 5 GNSS receivers, most preferably at least 7 GNSS receivers. Further, the method may be used to check for satellite signal deformation of only 1 satellite, but typically is used to check for satellite signal deformation of at least 3 satellites, preferably at least 5 satellites, most preferably at least 10 satellites in parallel; typically all satellites intended for use in position determination by the GNSS receivers are checked with the inventive method. The method may be applied for making position determination safer in particular in railway applications; for this purpose, one or a plurality of GNSS receivers may be placed on a train, in particular a running train. However, numerous further applications, such as position determination for ships and airplanes, are also possible. The invention may be applied for example with GPS L1 C/A signals or GLONASS L1 CSA signals.

In summary, the inventive method proposes a single test metric, which allows for a distinct integrity and continuity performance allocation and probabilistic performance assessment. All applied transformations are linear, so the original link to the underlying distribution of raw input values (autocorrelation function values) is maintained. The invention provides a higher susceptibility of signal deformations, as compared to known metrics. Additionally a specific correlator spacing (in particular a non-symmetric distribution) of the correlator measurement points (used chip spacing positions) may be utilized, in particular with more "late" correlator points configured, to increase the detection performance. The transformation to principal components maximizes the test metric size in case of faulted (from normal deviating) signals. A significant advantage is the fast convergence of the algorithm: Conventional covariance estimators and eigenvalue determination schemes require a large amount of data to increase the confidence on the eigenvalue resolution. When a recursive scheme is applied, in accordance with the invention, these disadvantages are avoided and a fast applicability of the monitor discriminator with a relatively short waiting period is provided. With small noise under nominal conditions, which is typically the case for GBAS ground subsystem installations, the operational range of the monitor extends, i.e. it provides more space for the trade-off between integrity and continuity than other monitors. A minimized highpass behavior and a possibility for statistic calibration provides detection capability also for ramp-like or slow changes (signal deformations) besides sudden changes. Note that the test metric can be calibrated; depending on the application, this may be advantageous, since no integrity violations will result with a misconfigured bias calibration of the monitor.

Preferred Variants of the Invention

In a preferred variant of the inventive method, in step a), a respective measurement value $X_{m,i,k}$ is derived from one function value at a particular chip spacing, combined for said multitude of GNSS receivers. In this case, the chip spacing index may describe said particular chip spacing directly. This is particularly simple to calculate, and may be particularly useful in signal deformations broadening or narrowing the autocorrelation function curve in time. In this variant, for each GNSS receiver (or the respective received GNSS code signal) of the multitude of GNSS receivers, the one functional value at the particular chip spacing (see m) is determined, and the entirety of these functional values from the multitude of receivers are used for deriving the measurement value by combining these functional values (e.g. by averaging or applying a weighting function).

In an alternative variant, in step a), a respective measurement value $X_{m,i,k}$ is derived from a combination of function values of different chip spacings, in particular from a difference of function values of two neighboring chip spacings, combined for said multitude of GNSS receivers. In this case, the chip spacing index m describes (or contains) the (particular) combination (e.g. pair) of corresponding chip spacings. The typical method of combination is calculating a difference of two functional values, which preferably correspond to neighboring chip spacings. This may be particularly useful in identifying signal deformations resulting in strong gradients in the autocorrelation function curve. In this typical case, for each GNSS receiver (or the respective received GNSS code signal) of the multitude of GNSS receivers, the difference between two functional values at two different (particular) chip spacings is determined, and the entirety of these differences (for the two functional values at the particular chip spacings) from the multitude of receivers are used for deriving the measurement value by combining these differences (e.g. by averaging or applying a weighting function). Analogue procedure may be applied for other methods of combination than calculating a difference of function values.

Particularly preferred is a variant wherein at least for some time epochs $t_n$, in particular later time epochs $t_n$, in step b) and c), obtaining the correlation matrix $R_{i,n}$ and the principal component analysis is done recursively, taking into account eigenpairs obtained for a previous time epoch for the same satellite i. Typically, for this approach, a "next" matrix $R_{i,k+1}$ is expressed as a function of "previous" matrix $R_{i,k}$, and the eigenpairs obtained for $R_{i,k}$ before are used for calculating the eigenpairs of $R_{i,k+1}$. This accelerates the calculation of the "next" matrix $R_{i,k+1}$ (or its components) and/or of the eigenpairs of "next" correlation matrix $R_{i,k+1}$ and reduces the amount of information to be stored enormously as compared to a "common" calculation (in particular for later time epochs $t_n$, i.e. where n is large), and may allow in particular a "real time" calculation of $SQM_{i,n}$.

In an advantageous further development of this variant, in an expression for calculating the correlation matrix $R_{i,n}$ recursively, a forgetting factor $\tau$ is applied, such that the older a time epoch $t_k$, the less it contributes to the expression for calculating the correlation matrix $R_{i,n}$, in particular wherein the forgetting factor performs an exponential weighting with respect to time. In this way, an adequate weight of recent changes in the signal form may be identified, even if the algorithm has been initialized long ago.

Particularly preferred is a method variant wherein at least for some time epochs $t_n$, in particular earlier time epochs $t_n$, in step c), the principal component analysis is done for the respective correlation matrix $R_{i,n}$ for a plurality of time epochs $t_k$ with k=1 . . . n in common,
in particular where $R_{i,n}$ is calculated with $R_{i,n}=1/(n-1)$ $*X^T_{i,n} X_{i,n}$, with n being the number of measurement epochs since algorithm initialization and $X^T_{i,n}$ being the transpose matrix of $X_{i,n}$. For early time epochs (i.e. with n being small), a common (non-recursive) calculation is relatively simple to do.

In a preferred variant, in step a), the respective measurement values $X_{m,i,k}$ are derived from normalized and bias-removed function values of the autocorrelation functions of the GNSS code signals received at the GNSS receivers, averaged over the multitude of the GNSS receivers. Averaging the function values is a particularly simple way to obtain a combined information from a multitude (and typically all) GNSS receivers at chip spacing index value m. Note that alternatively, weighted calculations may be applied, for example averages of the squared function values or function value combinations.

In a particularly preferred variant, in step a), for forming the measurement values $X_{m,i,k}$ of vector $\vec{X}_{i,k}$, the function values of the autocorrelation function undergo said bias removal, taking into account corresponding function values of an autocorrelation function that would result from a GNSS code signal received at receiver j affected only by expected signal deformation, in particular caused by satellite hardware and/or receiver hardware and/or signal processing, thus obtaining per GNSS receiver j a vector $\vec{P}_{i,j,k}$ of difference values $\bar{p}_{m,i,j,k}$ for each time epoch $t_k$ and each satellite i. This is simple to establish in practice, and allows to take into account particularities of each receiver. The bias removal is either performed based on fixed, calibrated and configured bias values or based on bias values continuously determined over previous time epochs of fault free operation.

In a further development of the above two variants used in common, in step a), for forming the measurement values $X_{m,i,k}$ of vector $\vec{X}_{i,k}$, said averaging is done over a set of at least 2, preferably at least 5, most preferably at least 7, GNSS receivers on the difference values $\bar{p}_{m,i,j,k}$ of the vector $\vec{\bar{p}}_{i,j,k}$, thus obtaining a vector $\vec{\bar{p}}_{i,k}$ of averaged values $\bar{\bar{p}}_{m,i,k}$. In this way, a common information about the GNSS signals of the multitude of GNSS receivers may be obtained in a simple way.

In modification of the above further development, in step a), for forming the measurement values $X_{m,i,k}$ of vector $\vec{X}_{i,k}$, said normalization is done on the vector $\vec{\bar{p}}_{i,k}$ of averaged values $\bar{\bar{p}}_{m,i,k}$ by dividing the averaged values $\bar{\bar{p}}_{m,i,k}$ with the 1-sigma standard deviations $\sigma_m$ of Gaussian normal distributions describing the noise distribution in the fault-free case, thus obtaining the measurement values $X_{m,i,k}$ of vector $\vec{X}_{i,k}$. Due to the normalization of the measurement values $X_{m,i,k}$ the nominal correlation between the autocorrelation function values is already considered. In case the normalization was performed directly with the autocorrelation function values and afterwards the combination (like the difference) between the function values of the autocorrelation function was performed, the nominal correlation between the function values would not be removed by the normalization process and thus the test metric would show a small deviation in fault free conditions.

Particularly preferred is a variant wherein the correlation matrix $R_{i,n}$ is built on smoothed function values where the smoothing is achieved by a noise reduction process based on low-pass filtering. Smoothing reduces the influence of singular events, which typically are not caused by a satellite defect. Note that the smoothing may be performed before or after bias removal/combining (in particular averaging)/normalization, in accordance with this variant.

In an advantageous method variant, in step d), matrix $PC_{i,n}$ is based on all eigenvectors of $R_{i,n}$. By this means, a particularly high integrity can be achieved, i.e. it becomes unlikely that significant signal deformations remain undetected. Note that alternatively, only a part of the eigenvectors having the largest eigenvalues may be used, reducing the calculation efforts and thus accelerating the calculation.

Further preferred is a variant wherein the chip spacing index m contains at least 3 chip spacings, preferably at least 5 chip spacings. In other words, m runs at least from 1 to 3 or at least from 1 to 5. The number of chip spacings ("positions") is also referred to as M. In general, with more chip spacings, more reliably signal deformation detection (both with respect to integrity and continuity) may be achieved.

Particularly preferred is a variant wherein the chip spacings of the autocorrelation function values used in obtaining the test metric are chosen predominantly on the late side. This has been found to increase the detection performance, as compared to a centered choice or a choice predominantly on the early side.

Advantageous is a variant wherein in step e), if $SQM_{i,n}$ exceeds THR in a time epoch $t_n$ for satellite i, the entirety of GNSS code signals received at all GNSS receivers belonging to signals of the same carrier frequency sent by the same satellite i in a number of subsequent time epochs are considered unsuitable for position determination due to satellite signal deformation, too. This increases reliability of the position determination and avoids inclusion of GNSS code signals into position determination for which no signal deformation may be identified, but the satellite from which the signal originates is still defect and therefore its signal not trustworthy.

Also within the scope of the present invention is a set of GNSS receivers, adapted for performing the inventive method described above. Such a set of GNSS receivers may achieve a very high reliability of position determination, both for "integrity" and for "continuity". Note that the set of GNSS receivers typically has a common controller device, which analyses the function values of the autocorrelation functions of these receivers, and decides on blocking of particular satellites (or signals received from them) at the set of receivers. Note that the GNSS receivers of a set may belong to a GBAS (ground based augmentation system) ground subsystem, in particular to perform CAT III approach and landing operations, or an SBAS (satellite based augmentation system) ground station, in particular for SBAS Ranging and Integrity Monitoring Stations (RIMS). A set of receivers may further include one or a plurality of receivers placed on a running train or on multiple running trains; position information may be used to identify occupied and non-occupied tracks, in particular for railway signaling.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DETAILED DESCRIPTION OF THE PREFERRED EMBODIMENTS

1. Inventive Set of GNSS Receivers

Figure 1:
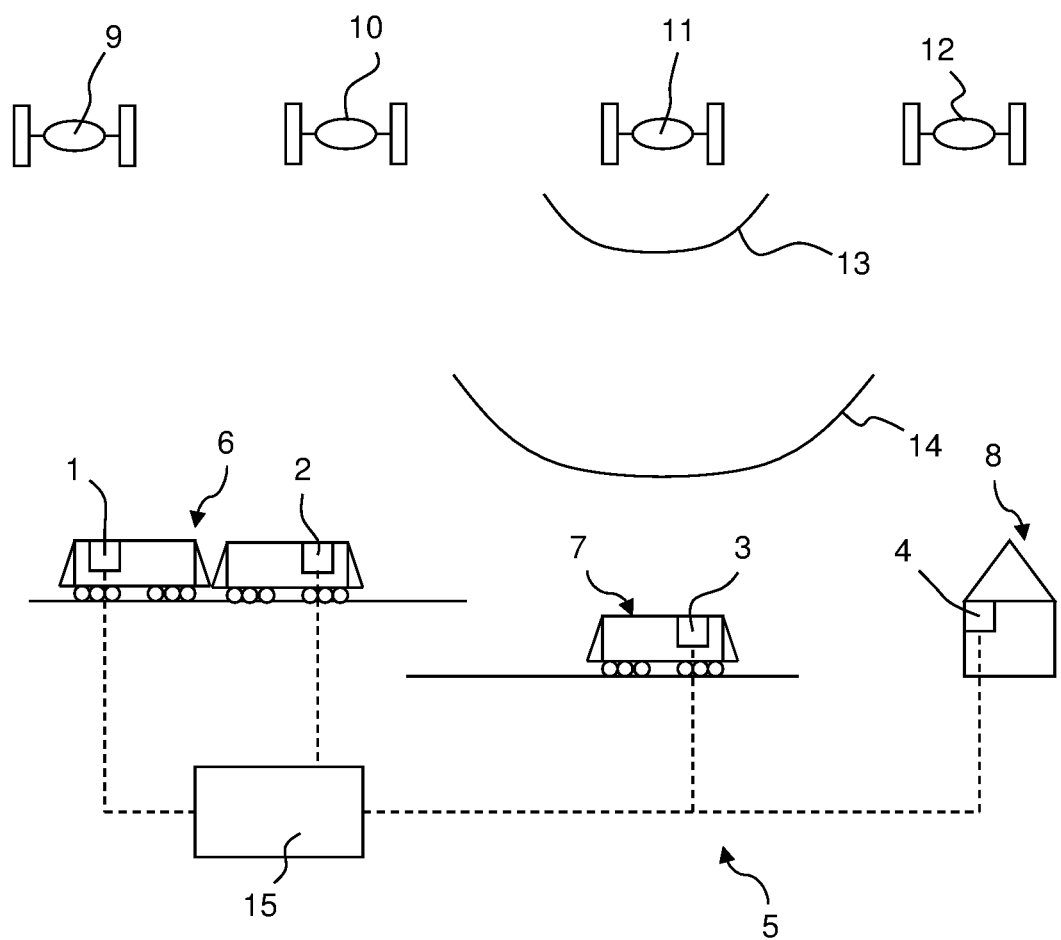
FIG. 1 shows a schematic illustration of an inventive set of receivers and a multitude of satellites for use in the inventive method.

FIG. 1 illustrates in a schematic view a set 5 of GNSS (global navigation satellite system) receivers 1-4 which are operated in accordance with the inventive method.

In the example shown, two GNSS receivers 1, 2 are located on a first running train 6, namely at the front and at the end of said train 6. Another GNSS receiver 3 is located on a second running train 7 here. Further, a GNSS receiver 4 is located at an immobile ground station 8. GNSS receivers 1, 2, 3 are used for position determination of trains 6, 7. Further, GNSS receiver 4 (whose position is known and not variable) is used to support the position determination at the other GNSS receivers 1-3, here by providing correction information about satellite paths necessary for position determination at the other receivers 1-3.

A plurality of satellites 9-12, four of which are shown here, orbit in space and send out GNSS code signals, here simply referred to as signals 13, 14, periodically. The signals 13, 14 are received at the GNSS receivers 1-4, with the received signals being referred to as GNSS code signals. The time of their arrival at the respective GNSS receivers 1-4 is used to obtain position information, taking into account known satellite trajectories and known transmission times, and applying a synchronization of clocks of receivers 1-4 and satellites 9-12. Note that in general, the signals 13, 14 of four satellites 9-12 are required at a GNSS receiver 1-4 to obtain a full position information (longitude, latitude, altitude), including one satellite for time synchronization purposes. In railway applications, where trains can only move on known railway tracks, two satellites 9-12 may be enough for position determination. Note that GPS (global positioning system), with which the invention may be applied, as a typical global navigation satellite system provides at least twenty-four satellites operational in space.

The signal 13, 14 is typically a sine wave-like carrier signal onto which a binary code signal is modulated. The time of arrival of a signal 13, 14 is typically determined via an autocorrelation function, which correlates the demodulated code part of the received signal 13, 14 with a reference code signal (or replica GNSS code signal) at different discrete chip spacings (or time delays) in the GNSS receiver 1-4, and the time delay leading to maximum of the autocorrelation function can be assumed to indicate the time of arrival.

When the signal generation part of a satellite 9-12 is defective, the sent signals 13, 14 can be deformed (corrupted), and the received GNSS code signals at the receivers 1-4 result in deformed autocorrelation function curves. According to the invention, autocorrelation function values of all receivers 1-4 are analyzed as described below in more detail, wherein information about GNSS code signals of the same satellite are combined and used for determining whether the code signal generating part of this satellite works properly. By means of a signal quality monitor test metric it is decided whether all GNSS code signals received from this satellite at all receivers are included in or excluded from position determination. For this purpose, the GNSS code receivers provide autocorrelation function values about the received GNSS code signals to a common controller device 15 here, which analyses the autocorrelation function values and indicates to the receivers 1-4 which satellites 9-12 or their respective received GNSS code signals are currently suitable for position determination.

2. Autocorrelation Function

Figure 2:
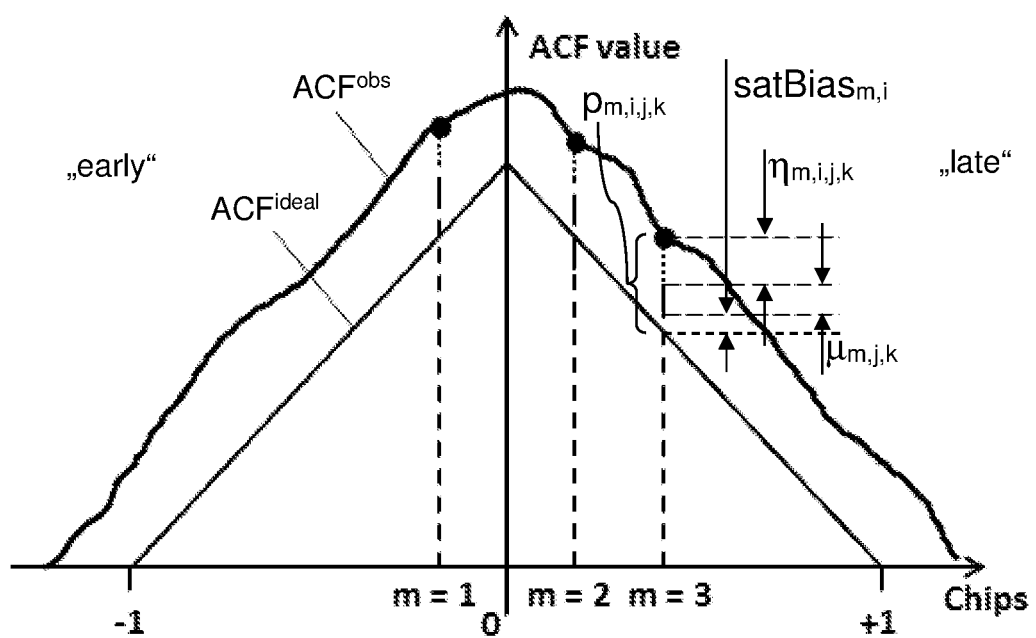
FIG. 2 shows a schematic illustration of an autocorrelation function obtained at a GNSS receiver, in the course of the inventive method, in a situation without a satellite defect.

FIG. 2 shows a typical curve of an observable autocorrelation function $ACF^{obs}$ (upward axis) for a received GNSS code signal from a satellite i in a particular (measurement) time epoch $t_k$ at a GNSS receiver j as a function of the chips or time delay (axis to the right). The autocorrelation function $ACF^{obs}$ is wavy, and deviates from the strictly triangular ideal autocorrelation function $ACF^{ideal}$ that would result if the GNSS code signal received at the GNSS receiver was unaffected by any signal deformation, in particular caused by receiver hardware, satellite hardware and signal processing.

In practice, the observable autocorrelation function $ACF^{obs}$ is determined ("measured") only at a few discrete chip spacings, compare chip spacing index m. In the example shown, m runs from 1 to 3, i.e. the number of chips spacing positions is M=3. The chip spacing positions are chosen here predominantly on the "late" side (on the right side of chip=0).

The observable autocorrelation function $ACF^{obs}$ is determined, in the course of the invention, in each time frame $t_k$ for each GNSS receiver j and for each satellite i (for a particular carrier frequency) for a plurality of chip spacings m, so the observable autocorrelation function values can be noted as $ACF^{obs}_{m,i,j,k}$. The ideal autocorrelation function $ACF^{ideal}$ is typically independent from the GNSS receiver and the time frame $t_k$, but dependent on the autocorrelation characteristics of the pseudo-random noise code sequence that is broadcast by satellite i (see [AD03]), so the ideal autocorrelation function values can be noted as $ACF^{ideal}_{m,i}$.

The information about signal deformation (and therefore possible satellite defects) is included in the difference between the observable autocorrelation function and the ideal autocorrelation function, with $$p_{m,i,j,k} = ACF^{obs}_{m,i,j,k} - ACF^{ideal}_{m,i} \quad [E1]$$

Typically, a GNSS receiver provides said values $p_{m,i,j,k}$ for further analysis, i.e. for use as autocorrelation function values, in accordance with the invention. Subtracting $ACF^{ideal}_{m,i}$ is in this case done already within the GNSS receiver, and as a first step of a bias removal. However, note that alternatively, this first step of bias removal can also be done later on, in particular together with the further bias removals.

In FIG. 2 shown, $ACF^{obs}$ only contains components expected, namely from the "ideal" autocorrelation function $ACF^{ideal}_{m,i}$, from receiver bias (see $\mu_{m,j,k}$), from satellite bias (see $satBias_{m,i}$) and from thermal (measurement) noise (see $\eta_{m,i,j,k}$). In the course of the invention, it is intended to identify further deformations of the $ACF^{obs}$, i.e. deformations that go beyond the expected deformation in agreement with expected components, also referred to as "evil waveform" (see below).

3. Overview Over the Inventive Method

Figure 3:
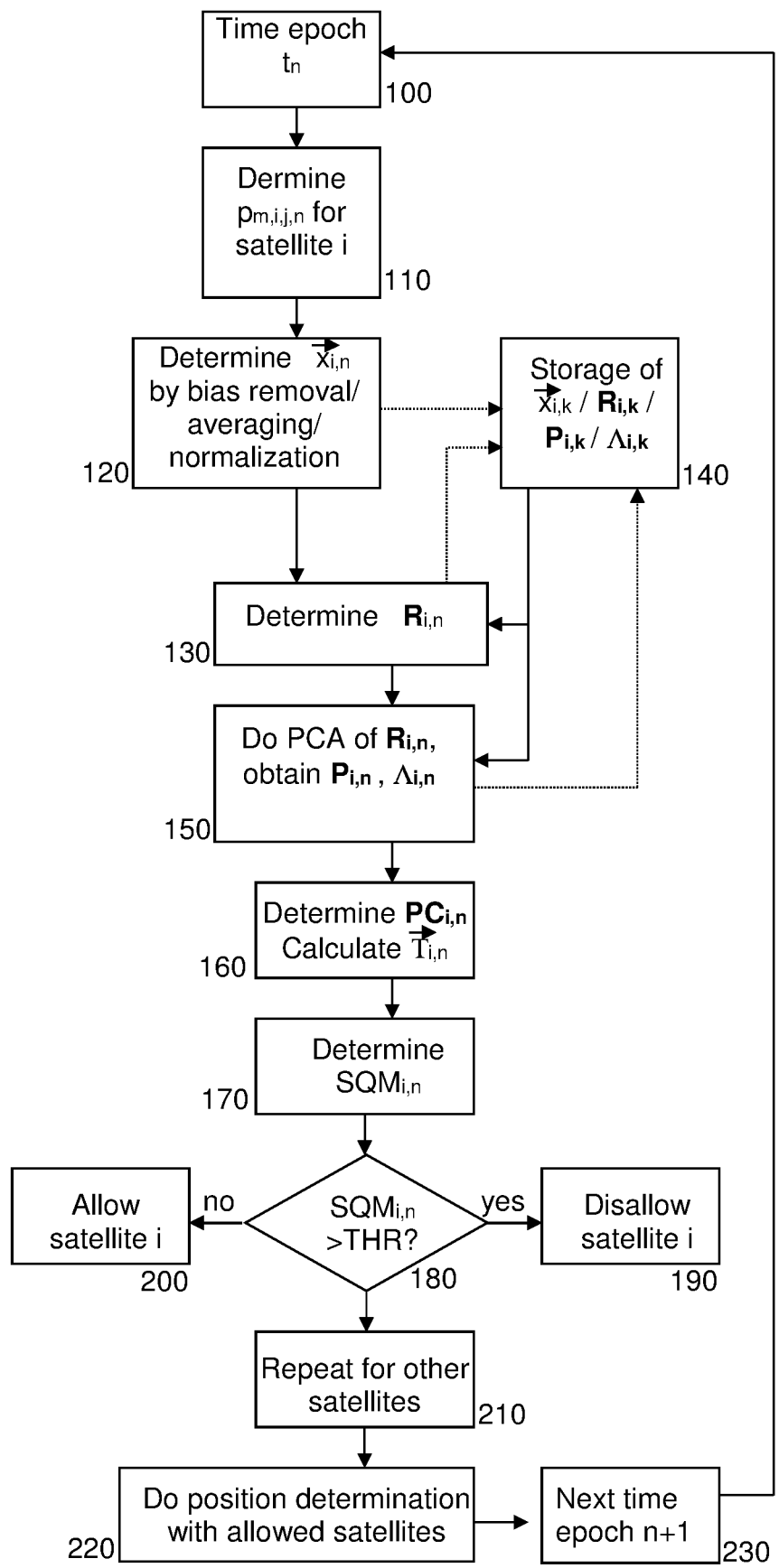
FIG. 3 shows a schematic flow diagram of a variant of the inventive method.

The course of the inventive method for operating a plurality of GNSS receivers is described by way of the example below and in correlation with FIG. 3.

For a given (monitoring) time epoch $t_n$, compare 100, the autocorrelation function values $p_{m,i,j,n}$ for a particular satellite i or for its corresponding received GNSS code signals, respectively, are determined 110 at each receiver j=1, ..., J (with J: amount of GNSS receivers participating) for all considered chip spacings m=1, ..., M (with M: number of chip spacings considered). In the example shown, the determined autocorrelation function values $p_{m,i,j,n}$ are already bias-removed with respect to the ideal (triangular) autocorrelation, as described in [E1], but still contain the signal deformations by receiver hardware, satellite hardware and signal processing.

As a next step 120, the autocorrelation function values $p_{m,i,j,n}$ are further prepared, namely by removing remaining biases due to receiver hardware (compare $\mu_{m,j,k}$ above), satellite hardware (compare $satBias_{m,i}$ above) and signal processing. Then, apart from statistical variations like thermal noise, the only remaining contribution to the bias-removed autocorrelation signal should be based on potentially present evil waveform. Further, an averaging of the bias-removed autocorrelation function values is done over the J receivers participating. Finally, a normalization is done, compensating the non-unit variance thermal noise levels of particularly $ACF^{obs}$ component $\eta_{m,i,j,k}$. The resulting bias-removed, averaged and normalized measurement values $X_{m,i,n}$ with unit variance can be rewritten as vector $\vec{X}_{i,n}$, the vector entries running from m=1 to M.

Then in step 130, a correlation matrix $R_{i,n}$ is determined, involving e.g. matrix multiplication of $X_{i,n}^T$ and $X_{i,n}$, wherein $$X_{i,n} = \begin{bmatrix} \vec{X}_{i,1} \\ \vdots \\ \vec{X}_{i,n} \end{bmatrix}.$$

Here previous vectors $\vec{X}_{i,k}$ for k<n can be obtained from a readout of a storage 140. The storage also provides previous $R_{i,k}$ for k<n which can be used for calculating $R_{i,n}$. Further, the storage stores eigenvectors and eigenvalues of previous correlation matrices $R_{i,k}$ with k<n.

As a next step 150, correlation matrix $R_{i,n}$ undergoes a principal component analysis (PCA) for obtaining a matrix $P_{i,n}$ of eigenvectors and a matrix $\Lambda_{i,n}$ of eigenvalues, here applying a recursive approach using previous correlation matrices $R_{i,k}$, previous matrices of eigenvectors $P_{i,k}$ and previous matrices of eigenvalues $\Lambda_{i,k}$.

It should be noted that $\vec{X}_{i,n}$, $R_{i,n}$, $P_{i,k}$ and $\Lambda_{i,k}$ are stored for preparing the next time epoch, compare the dotted lines to storage 140.

Taking at least the two eigenvectors with the largest eigenvalues into a principal component matrix $PC_{i,n}$, a vector $\vec{T}_{i,n} = PC_{i,n}^T \cdot \vec{X}_{i,n}^T$ is determined, see step 160.

Then a signal quality monitor test metric $SQM_{i,n}$ is calculated, by adding the squares of the vector entries of $\vec{T}_{i,n}$, compare step 170.

Then $SQM_{i,n}$ is compared with a predefined threshold value THR, see step 180. THR is chosen such that a desired integrity is achieved, e.g. such that detection of a signal distortion leading to a position determination error of more than 0.75 m is missed with a likelihood of $10^{-9}$ or less. As a characteristic of the inventive method, thanks to the principal component analysis, the continuity will remain high at the same time, i.e. the probability of falsely detecting a signal distortion despite the signal being fine is low, such as $10^{-9}$ or less.

If $SQM_{i,n} >$ THR, the currently checked satellite i is excluded from position determination at the GNSS receivers at least for the present time epoch $t_n$, and preferably also for a number of future time epochs (or until external news spreads that satellite i is working fine again, e.g. for GPS via NANUs (Notice Advisory to Navstar Users)), compare step 190.

If $SQM_{i,n} \leq$ THR, the currently checked satellite i is (or stays) allowed for position determination at the GNSS receivers for the present time epoch $t_n$, compare step 200.

The described routine is repeated for all satellites participating in the method, compare step 210. Typically all satellites that are set up for position determination of the GNSS receivers should be checked in general.

Once it is clear which satellites may contribute to position determination of the GNSS receivers in time epoch $t_n$, position determination based on the received GNSS code signals received in the current time epoch $t_n$ may be performed, see step 220, using received GNSS code signals from allowed satellites, and not using received GNSS code signals from excluded satellites.

The method is then repeated for the next time epoch with index value n+1, compare step 230.

4. Description of the Inventive Method in its Preferred Mode

In the following, a more detailed description is given for the course of the inventive method by way of example, in its preferred mode.

Characterization of Measured Autocorrelation Function (ACF) Values

The functional model for the raw Autocorrelation Function (ACF) correlator measurements can be described by (compare also FIG. 2 again):

$$p_{m,i,j,k} = \mu_{m,j,k} + satBias_{m,i} + \eta_{m,i,j,k} (+EWF_{m,i,j,k}) \quad [E2]$$

where:
- $p_{m,i,j,k}$ = autocorrelation function value, measured at discrete PRN (pseudo-random noise) code chip spacing point index m (with $m \in \{1, \ldots, M$ and $M \geq 3\}$, where M is the number of chip spacings along the autocorrelation function (ACF)) for GNSS satellite i at GNSS receiver j for epoch $t_k$,
- $\mu_{m,j,k}$ = receiver bias estimate at discrete chip spacing point index m at receiver j for epoch $t_k$,
- $satBias_{m,i}$ = PRN code-related satellite bias of satellite i at the $m^{th}$ chip spacing; typically determined offline from long measurement campaigns and then configured or determined continuously online during signal deformation fault-free measurement epochs. The PRN-code related satellite bias is also dependent on the specific hardware of the Satellite Vehicle (SV). PRN switches to a different Satellite Vehicle Number (SVN) usually occur when a satellite is replaced.
- $\eta_{m,i,j,k}$ = measurement noise at chip spacing index m for satellite i at receiver j for epoch $t_k$,
- $EWF_{m,i,j,k}$ = optional signal deformation ("Evil Waveform") error at point m for satellite i at receiver j for epoch $t_k$. An "Evil waveform" contribution occurs in case of a satellite defect, and this contribution to the autocorrelation function values shall be detected in the course of the invention, in order to avoid use of corrupted GNSS code signals in position determination.

The distribution function of each chip spacing point's ACF values $p_{m,i,j,k}$ over time can be described by Gaussian normal distribution functions:

$$p_{m,i,j,k} \rightarrow N(\mu acf_{m,i,j,k}, \sigma^2_{m,i,j,k}) \quad [E3]$$

where:
- m = ACF measurement point index (with $m \in \{1, \ldots, M\}$),
- i = satellite index,
- j = receiver index,
- k = measurement time epoch index,
- $\mu acf_{m,i,j,k}$ = mean value of ACF values at chip spacing point m for satellite i at receiver j until epoch $t_k$,
- $\sigma_{m,i,j,k}$ = standard deviation of ACF values at chip spacing point m for satellite i at receiver j until epoch $t_k$; virtually identical to standard deviation of measurement noise $\eta_{m,i,j,k}$.

Desired Characterization Input Values to the Principal Component Analysis

To optimize the statistical properties of the input to the subsequently described Principal Component Analysis (PCA), a bias removal and normalization of the ACF values $p_{m,i,j,k}$ is carried out to obtain jointly standard normally distributed input data with zero mean and unit variance:

$$X_{m,i,k}(p_{m,i,j,k}) \rightarrow N(0,1) \quad [E4]$$

where:
- $X_{m,i,k}(p_{m,i,j,k})$ = bias-free, normalized metric for chip spacing point m for satellite i at epoch $t_k$ averaged over all GNSS receivers; function of $p_{m,i,j,k}$.

Input Value Preparation: Satellite Bias Removal from ACF Measurement Data and Smoothing with a Short Filter Time Constant for Noise Reduction First, any satellite biases are removed from the ACF measurements and the satellite bias-free result is (e.g. 30-second) smoothed to mitigate multipath-related effects. The (e.g. 30 s) smoothing represents a first order low pass filter and is performed to reduce the noise on the raw ACF measurements:

$$\bar{p}_{m,i,j,k} = \frac{k_{30} - 1}{k_{30}} \cdot \bar{p}_{m,i,j,k-1} + \frac{1}{k_{30}} \cdot (p_{m,i,j,k} - satBias_{m,i}) \quad [E5]$$

where:
- $\bar{p}_{m,i,j,k}$ = smoothed ACF value at point m (with $m \in \{1, \ldots, M\}$ and $M \geq 3$) for satellite i at receiver j for epoch $t_k$, $k_{30}$=example filter time constant of 30, increasing from 1 to 30 for the initial 30 epochs and then remaining constant, satBias$_{m,i}$=PRN code-related satellite bias of satellite i at the $m^{th}$ chip spacing point; determined offline from long measurement campaigns and then configured.

Input Value Preparation: GNSS Receiver-Specific ACF Measurement Bias Determination Via Smoothing of Satellite Bias-Free Receiver Bias Estimates with a Long Filter Time Constant The satellite bias-free but non-smoothed ACF measurements are also used to determine GNSS receiver bias estimates, which are smoothed with a long filter time constant (of like for example 1000 s) to avoid short-term variations like noise while preserving long-term variations like drifts:

$$\mu_{m,j,k} = \frac{k_{1000} - 1}{k_{1000}} \cdot \mu_{m,j,k-1} + \frac{1}{k_{1000}} \cdot \frac{1}{N_{sat}} \cdot \sum_{i=1}^{N_{sat}} (p_{m,i,j,k} - satBias_{m,i}) \quad [E6]$$

where:

$\mu_{m,j,k}$=receiver bias estimate at chip spacing point m at receiver j for epoch $t_k$, $p_{m,i,j,k}$ =raw ACF measurement value at point m for satellite i at receiver j for epoch $t_k$, $k_{1000}$=example filter time constant of 1000, increasing from 1 to 1000 for the initial 1000 epochs and then remaining constant, $N_{sat}$=number of satellites, which fulfill the following conditions:
1. Satellite is visible, above 5° elevation and "healthy" at this receiver at time epoch $t_k$,
2. In the previous time epoch $t_{k-1}$ the satellite was not subject of a signal deformation detection.
   The number of satellites fulfilling these conditions must be at least 1, but should preferably be ≥5, otherwise the receiver bias is not updated in this example. Condition 2) is used to avoid any evil waveform (EWF)-related falsification of the receiver bias estimates.

In case the set of available satellites is sufficiently large, the satellite i that shall be monitored for presence of signal deformations can optionally be excluded from computation of $\mu_{m,j,k}$.

Input Value Preparation: Computation of GNSS Receiver Bias Estimate Differences Between Subsequent Measurement Epochs $t_k$ The PCA algorithm used in this example does not need the actual receiver bias estimates but their differences between subsequent time epochs:

$$\Delta\mu_{m,j,k} = \mu_{m,j,k} - \mu_{m,j,k-1} \quad [E7]$$

The rationale for this will be explained later-on. If the receiver bias estimates are not updated due to $N_{sat}$<4 in [E6], then the bias differences become zero.

Input Value Preparation: GNSS Receiver Bias Removal from Satellite Bias-Free, Smoothed ACF Measurement Data The (e.g. 30-second) smoothed, satellite bias-free measurement data of [E5] is made receiver bias-free by subtracting the corresponding estimates of [E6]:

$$\bar{p}_{m,i,j,k} = \bar{p}_{m,i,j,k} - \mu_{m,j,k} \quad [E8]$$

The measurement data is now assumed to be bias-free and zero-centered.

Input Value Preparation: Averaging of Bias-Free ACF Measurement Data and Receiver Bias Differences Over All GNSS Receivers Receiver bias differences and smoothed bias-free measurement data are then averaged over all valid receivers:

$$\Delta\mu_{m,i,k} = \frac{1}{N_{Rx,i}} \cdot \sum_{j=1}^{N_{Rx,i}} \Delta\mu_{m,j,k} \quad [E9]$$

$$\bar{p}_{m,i,k} = \frac{1}{N_{Rx,i}} \cdot \sum_{j=1}^{N_{Rx,i}} \bar{p}_{m,i,j,k} \quad [E10]$$

where:

$N_{Rx,i}$=number of receivers, for which valid smoothed and bias-free ACF measurement data $\bar{p}_{m,i,j,k}$ is available for satellite i.

The minimum number of receivers is 2; otherwise no principal component analysis is carried out for this satellite.

Optional Step—Input Value Preparation: Combination of ACF Values from Different Chip Spacing Points The averaged metrics of [E9] and [E10] can then be used to combine different chip spacing points with each other, e.g. by forming differences between two neighbouring chip spacing points:

$$\Delta\mu_{m,i,k} = \Delta\mu_{m+1,i,k} - \Delta\mu_{m,i,k} \quad [E11]$$

$$\bar{p}_{m,i,k} = \bar{p}_{m+1,i,k} - \bar{p}_{m,i,k} \quad [E12]$$

Note: An in-place notation of the parameters (meaning that the same variable appears on both sides of the equality sign) as used in programming languages is taken here so that with ignoring this section the whole algorithm remains valid for the case when not using this step.

Input Value Preparation: Normalization of Bias-Free Measurement Data

To ensure unit variance of the bias-free and zero-centered measurement data, the data is normalized by the standard deviation of a Gaussian distribution characterizing the noise of the measurement data:

$$X_{m,i,k} = \frac{\bar{p}_{m,i,k}}{\sigma_m(el_{i,k})} \quad [E13]$$

where:

$el_{i,k}$=elevation angle of satellite i at epoch $t_k$, $\sigma_m(el)$=elevation-dependent standard deviation of the $m^{th}$ ACF chip spacing point's (or OPTIONALLY of chip spacing point pair's) smoothed and bias-free measurements; determined offline from long measurement campaigns and then configured.

The $X_{m,i,k}$ data is now assumed to behave like Gaussian random variables following a standard normal distribution $N(0,1)$ in the absence of a signal deformation fault on satellite i.

Taking into account [E8], [E13] can be expressed in vector notation as $$\vec{X}_{i,k} = \{X_{m,i,k}\} = \left[ \frac{\bar{p}_{1,i,k}}{\sigma_1(el_{i,k})} \cdots \frac{\bar{p}_{M,i,k}}{\sigma_M(el_{i,k})} \right] \quad [E14]$$

$$= [\overline{p}_{1,i,k} - \mu_{1,i,k} \cdots \overline{p}_{M,i,k} - \mu_{M,i,k}] \cdot \begin{bmatrix} \frac{1}{\sigma_1(el_{i,k})} & \cdots & 0 \\ \vdots & \ddots & \vdots \\ 0 & \cdots & \frac{1}{\sigma_M(el_{i,k})} \end{bmatrix}$$

$$= [\overline{p}_{1,i,k} - \mu_{1,i,k} \cdots \overline{p}_{M,i,k} - \mu_{M,i,k}] \cdot \overset{-1}{\Sigma}$$

$$= [\vec{\overline{p}}_{i,k} - \vec{\mu}_{i,k}] \cdot \overset{-1}{\Sigma}$$

PCA Algorithm—Explicit Approach

In the explicit (non-recursive) approach, PCA works batch-wise meaning that all normalized data since process start is used to determine the principal components via the correlation or covariance matrix $R_{i,n}$ of the whole data set (i.e. PCA of matrix $R_{i,n}$ is done for a plurality of time epochs $t_k$ with k=1 . . . n in common). The explicit approach is typically used for an early stage of the inventive method, i.e. for low n. The eigendecomposition of this matrix $R_{i,n}$ can then be used for a principal component analysis:

$$R_{i,n} = \frac{1}{n-1} \cdot X_{i,n}^T \cdot X_{i,n} = \frac{1}{n-1} \cdot X_{i,n}^T \cdot \begin{bmatrix} \vec{X}_{i,1} \\ \vdots \\ \vec{X}_{i,n} \end{bmatrix} = P_{i,n} \cdot \Lambda_{i,n} \cdot P_{i,n}^T \quad [E15]$$

where:
n=number of measurement epochs since algorithm initialization,
$X_{i,n}$=normalized data for ACF point m and satellite i at measurement time epoch $t_k$ with k=1, . . . n,
$P_{i,n}$=orthogonal matrix containing the eigenvectors of $R_{i,n}$ so that it holds $P^T=P^{-1}$,
$\Lambda_{i,n}$=diagonal matrix containing the eigenvalues of $R_{i,n}$. Each eigenvector in $P_{i,n}$ forms an eigenpair with the eigenvalue of the same column in $\Lambda_{i,n}$.

Since in the present case the data is scaled to unit variance the correlation matrix is used.

PCA Algorithm—Derivation of Recursive Approach

In a real-time environment this batch-wise approach is disadvantageous as a huge amount of sample data would have to be stored, at least for higher n. Accordingly, at later stages of the inventive method, i.e. for large n, a recursive PCA is applied. A recursive correlation matrix update suitable for the invention is described below. Note that a recursive PCA is described in [RD01] and [RD02].

In a batch-wise consideration, for the correlation matrix the whole time series since process start from $t_1$ to $t_{k+1}$ (with n=k+1) needs to be taken into account:

$$X_{i,n} = X_{i,1 \to k+1} = \begin{bmatrix} \vec{X}_{i,1} \\ \vdots \\ \vec{X}_{i,k+1} \end{bmatrix} = \begin{bmatrix} \vec{\overline{p}}_{i,1} - \vec{\mu}_{i,k+1} \\ \vdots \\ \vec{\overline{p}}_{i,k+1} - \vec{\mu}_{i,k+1} \end{bmatrix} \cdot \overset{-1}{\Sigma} \quad [E16]$$

$$= \left[ \begin{bmatrix} \vec{\overline{p}}_{i,1} \\ \vdots \\ \vec{\overline{p}}_{i,k} \\ \vec{\overline{p}}_{i,k+1} \end{bmatrix} - \begin{bmatrix} \vec{\mu}_{i,k+1} \\ \vdots \\ \vec{\mu}_{i,k+1} \\ \vec{\mu}_{i,k+1} \end{bmatrix} \right] \cdot \overset{-1}{\Sigma}$$

$$= \begin{bmatrix} \overline{p}_{i,1} - \begin{bmatrix} 1 \\ \vdots \\ 1 \end{bmatrix} \cdot \vec{\mu}_{i,k+1} \\ \vec{\overline{p}}_{i,k+1} - \vec{\mu}_{i,k+1} \end{bmatrix} \cdot \overset{-1}{\Sigma}$$

$$= \begin{bmatrix} \overline{p}_{i,1} - \begin{bmatrix} 1 \\ \vdots \\ 1 \end{bmatrix} \cdot \vec{\mu}_{i,k} - \begin{bmatrix} 1 \\ \vdots \\ 1 \end{bmatrix} \cdot \Delta\vec{\mu}_{i,k+1} \\ \vec{\overline{p}}_{i,k+1} - \vec{\mu}_{i,k+1} \end{bmatrix} \cdot \overset{-1}{\Sigma}$$

$$= \begin{bmatrix} \left( \overline{p}_{i,1} - \begin{bmatrix} 1 \\ \vdots \\ 1 \end{bmatrix} \cdot \vec{\mu}_{i,k} \right) \cdot \overset{-1}{\Sigma} - \begin{bmatrix} 1 \\ \vdots \\ 1 \end{bmatrix} \cdot \Delta\vec{\mu}_{i,k+1} \cdot \overset{-1}{\Sigma} \\ (\vec{\overline{p}}_{i,k+1} - \vec{\mu}_{i,k+1}) \cdot \overset{-1}{\Sigma} \end{bmatrix}$$

$$= \begin{bmatrix} X_{i,1 \to k} - \begin{bmatrix} 1 \\ \vdots \\ 1 \end{bmatrix} \cdot \Delta\vec{\mu}_{i,k+1} \cdot \overset{-1}{\Sigma} \\ \vec{X}_{i,k+1} \end{bmatrix}$$

where:
n=k+1=number of sample sets (i.e. measurement time epochs) from time epoch $t_1$ to $t_{k+1}$, $\vec{\mu}_{i,k+1} = \vec{\mu}_{i,k} + \Delta\vec{\mu}_{i,k+1}$=1×M vector of receiver bias estimates as determined over the whole time series, $\Sigma^{-1}$=M×M diagonal matrix of inverse standard deviations as determined over the whole time series.

In accordance with [E15] the correlation matrix $R_{i,k+1}$ of the time series $X_{i,1 \to k+1}$ is then given as:

$$R_{i,k+1} = \frac{1}{n_{k+1} - 1} \cdot X_{i,1 \to k+1}^T \cdot X_{i,1 \to k+1} \quad [E17]$$

$$= \frac{1}{n_{k+1} - 1} \cdot \begin{bmatrix} X_{i,1 \to k} - \begin{bmatrix} 1 \\ \vdots \\ 1 \end{bmatrix} \cdot \Delta\vec{\mu}_{i,k+1} \cdot \overset{-1}{\Sigma} \\ \vec{X}_{i,k+1} \end{bmatrix}^T \cdot$$

$$\begin{bmatrix} X_{i,1 \to k} - \begin{bmatrix} 1 \\ \vdots \\ 1 \end{bmatrix} \cdot \Delta\vec{\mu}_{i,k+1} \cdot \overset{-1}{\Sigma} \\ \vec{X}_{i,k+1} \end{bmatrix}$$

$$= \frac{1}{n_{k+1} - 1} \cdot \begin{bmatrix} X_{i,1 \to k}^T \cdot X_{i,1 \to k} + \\ \overset{-1}{\Sigma} \Delta\vec{\mu}_{i,k+1}^T \begin{bmatrix} 1 \\ \vdots \\ 1 \end{bmatrix}^T \begin{bmatrix} 1 \\ \vdots \\ 1 \end{bmatrix} \Delta\vec{\mu}_{i,k+1} \overset{-1}{\Sigma} - \\ \overset{-1}{\Sigma} \Delta\vec{\mu}_{i,k+1}^T \begin{bmatrix} 1 \\ \vdots \\ 1 \end{bmatrix}^T X_{i,1 \to k} - \\ X_{i,1 \to k}^T \begin{bmatrix} 1 \\ \vdots \\ 1 \end{bmatrix} \Delta\vec{\mu}_{i,k+1} \overset{-1}{\Sigma} + \vec{X}_{i,k+1}^T \cdot \vec{X}_{i,k+1} \end{bmatrix}$$

where:
$n_{k+1}$=k+1=number of sample sets (i.e. measurement time epochs) from time epoch $t_1$ to $t_{k+1}$.

This equation can be simplified due to the following side condition:

$$\begin{bmatrix} 1 \\ \vdots \\ 1 \end{bmatrix}^T X_{i,1 \to k} = \sum_{n=1}^{k} (\vec{p}_{i,n} - \vec{\mu}_{i,k}) \cdot \overset{-1}{\sum} \qquad [E18]$$

$$= \left( \sum_{n=1}^{k} \vec{p}_{i,n} - k \cdot \vec{\mu}_{i,k} \right) \cdot \overset{-1}{\sum}$$

$$= \left( \sum_{n=1}^{k} \vec{p}_{i,n} - k \cdot \frac{1}{k} \sum_{n=1}^{k} \vec{p}_{i,n} \right) \cdot \overset{-1}{\sum} = \vec{0}$$

Using this condition [E17] simplifies to $$R_{i,k+1} = \frac{1}{n_{k+1}-1} \cdot [X_{i,1 \to k}^T \cdot X_{i,1 \to k}] + \qquad [E19]$$

$$\frac{1}{n_{k+1}-1} \cdot \left[ \overset{-1}{\sum} \Delta \vec{\mu}_{i,k+1}^T \begin{bmatrix} 1 \\ \vdots \\ 1 \end{bmatrix}^T \begin{bmatrix} 1 \\ \vdots \\ 1 \end{bmatrix} \Delta \vec{\mu}_{i,k+1} \overset{-1}{\sum} \right] +$$

$$\frac{1}{n_{k+1}-1} \cdot \left[ \vec{X}_{i,k+1}^T \cdot \vec{X}_{i,k+1} \right]$$

Using a recursive notation by introducing $R_{i,k}$ leads to:

$$R_{i,k+1} = \frac{n_k - 1}{n_{k+1} - 1} \cdot R_{i,k} + \qquad [E20]$$

$$\frac{n_k}{n_{k+1}-1} \cdot \left[ \overset{-1}{\sum} \Delta \vec{\mu}_{i,k+1}^T \Delta \vec{\mu}_{i,k+1} \overset{-1}{\sum} \right] + \frac{1}{n_{k+1}-1} \cdot \left[ \vec{X}_{i,k+1}^T \cdot \vec{X}_{i,k+1} \right]$$

Using the fact that in the present use case it holds $n_{k+1} = n_{k+1}$ (since $n_{k+1} = k+1$ and $n_k = k$), it follows:

$$R_{i,k+1} = \frac{n_k - 1}{n_k} \cdot R_{i,k} + \left[ \overset{-1}{\sum} \Delta \vec{\mu}_{i,k+1}^T \Delta \vec{\mu}_{i,k+1} \overset{-1}{\sum} \right] + \frac{1}{n_k} \cdot \left[ \vec{X}_{i,k+1}^T \cdot \vec{X}_{i,k+1} \right] \qquad [E21]$$

Inserting the substitution $$\tau = \frac{1}{n_k} \qquad [E22]$$

into [E21] yields:

$$R_{i,k+1} = (1-\tau) \cdot R_{i,k} + \left[ \overset{-1}{\sum} \Delta \vec{\mu}_{i,k+1}^T \Delta \vec{\mu}_{i,k+1} \overset{-1}{\sum} \right] + \tau \cdot \left[ \vec{X}_{i,k+1}^T \cdot \vec{X}_{i,k+1} \right] \qquad [E23]$$

Letting now the value of τ deviate from its original definition from [E22] by setting it to a fixed value introduces a so-called forgetting factor. This means that older data gets exponentially ignored. τ can for instance be chosen to be 1/60, i.e. in line with the smoothing time constant in [E5]. Due to the introduced forgetting factor, the time period for which measurement data has an impact on the correlation matrix is limited and it can be assumed that the standard deviations (being configured) are constant over this time period as the elevation angle does not change a lot in this time period.

Assuming that from the previous epoch $t_k$ the principal components of the symmetric correlation matrix $R_{i,k}$ are known:

$$R_{i,k} = P_{i,k} \Lambda_{i,k} P_{i,k}^T = [\vec{v}_{1,i,k} \ \ldots \ \vec{v}_{M,i,k}] \cdot \begin{bmatrix} \lambda_{1,i,k} & \ldots & 0 \\ \vdots & \ddots & \vdots \\ 0 & \ldots & \mu_{M,i,k} \end{bmatrix} \cdot P_{i,n}^T \qquad [E24]$$

where:

$P_{i,k}$=orthogonal matrix containing column-wise the eigenvectors $\vec{v}_{m,i,k}$ of $R_{i,k}$ so that it holds $p_{i,k}^T = p_{i,k}^{-1}$, $\Lambda_{i,k}$=diagonal matrix containing the eigenvalues $\lambda_{m,i,k}$ of $R_{i,k}$.

At $t_{k+1}$ the situation can be expressed by:

$$R_{i,k+1} = P_{i,k+1} \cdot \Lambda_{i,k+1} \cdot P_{i,k+1}^T \qquad [E25]$$

$$= (1-\tau) \cdot R_{i,k} + \left[ \overset{-1}{\sum} \Delta \vec{\mu}_{i,k+1}^T \Delta \vec{\mu}_{i,k+1} \overset{-1}{\sum} \right] + \tau \cdot \left[ \vec{X}_{i,k+1}^T \cdot \vec{X}_{i,k+1} \right]$$

$$= (1-\tau) \cdot P_{i,k} \cdot \Lambda_{i,k} \cdot P_{i,k}^T + \left[ \overset{-1}{\sum} \Delta \vec{\mu}_{i,k+1}^T \Delta \vec{\mu}_{i,k+1} \overset{-1}{\sum} \right] + \tau \cdot \left[ \vec{X}_{i,k+1}^T \cdot \vec{X}_{i,k+1} \right]$$

$$= P_{i,k} \cdot \left[ (1-\tau) \cdot \Lambda_{i,k} + P_{i,k}^T \left[ \overset{-1}{\sum} \Delta \vec{\mu}_{i,k+1}^T \Delta \vec{\mu}_{i,k+1} \overset{-1}{\sum} \right] P_{i,k} \right] \cdot P_{i,k}^T + \tau \cdot \left[ \vec{X}_{i,k+1}^T \cdot \vec{X}_{i,k+1} \right]$$

$$= P_{i,k} \cdot \left[ (1-\tau) \cdot \Lambda_{i,k} + \vec{\mu}_{i,k} \cdot \vec{\mu}_{i,k}^T \right] \cdot P_{i,k}^T + \tau \cdot \left[ \vec{X}_{i,k+1}^T \cdot \vec{X}_{i,k+1} \right]$$

where:

$$\vec{\mu}_{i,k} = P_{i,k}^T \cdot \overset{-1}{\sum} \cdot \Delta \vec{\mu}_{i,k+1}^T \qquad [E26]$$

For the term $(1-\tau) \cdot \Lambda_{i,k} + \vec{\mu}_{i,k} \cdot \vec{\mu}_{i,k}^T$ in [E25] an eigendecomposition into eigenvector matrix $P'_{i,k}$ and eigenvalue matrix $\Lambda'_{i,k}$ can be carried out as described in [RD02] and [RD03]:

$$(1-\tau) \cdot \Lambda_{i,k} + |\vec{\mu}_{i,k}|^2 \cdot \frac{\vec{\mu}_{i,k}}{|\vec{\mu}_{i,k}|} \cdot \frac{\vec{\mu}_{i,k}^T}{|\vec{\mu}_{i,k}|} = P'_{i,k} \cdot \Lambda'_{i,k} \cdot P'^T_{i,k} \qquad [E27]$$

Inserting this eigendecomposition into [E25] yields:

$$R_{i,k+1} = P_{i,k} \cdot [P'_{i,k} \cdot \Lambda'_{i,k} \cdot P'^T_{i,k}] \cdot P^T_{i,k} + \tau \cdot [\vec{X}^T_{i,k+1} \cdot \vec{X}_{i,k+1}] \quad [E28]$$

$$= P_{i,k} \cdot \left[ P'_{i,k} \cdot \Lambda'_{i,k} \cdot P'^T_{i,k} + \tau \cdot P^T_{i,k} [\vec{X}^T_{i,k+1} \cdot \vec{X}_{i,k+1}] P_{i,k} \right] \cdot P^T_{i,k}$$

$$= P_{i,k} \cdot P'_{i,k} \cdot \left[ \Lambda'_{i,k} + \tau \cdot P'^T_{i,k} \cdot P^T_{i,k} [\vec{X}^T_{i,k+1} \cdot \vec{X}_{i,k+1}] P_{i,k} \cdot P'_{i,k} \right] \cdot P'^T_{i,k} \cdot P^T_{i,k}$$

$$= P''_{i,k} \cdot \left[ \Lambda'_{i,k} + \tau \cdot P''^T_{i,k} [\vec{X}^T_{i,k+1} \cdot \vec{X}_{i,k+1}] P''_{i,k} \right] \cdot P''^T_{i,k}$$

$$= P''_{i,k} \cdot \left[ \Lambda'_{i,k} + \tau \cdot \vec{Z}_{i,k} \cdot \vec{Z}^T_{i,k} \right] \cdot P''^T_{i,k}$$

where:

$$P''_{i,k} = P_{i,k} \cdot P'_{i,k} \quad [E29]$$

and $$\vec{Z}_{i,k} = P''^T_{i,k+1} \cdot \vec{X}^T_{i,k+1} \quad [E30]$$

For the term $\Lambda'_{i,k} + \tau \cdot \vec{Z}_{i,k} \cdot \vec{Z}_{i,k}^T$ in [E28] an eigendecomposition into eigenvector matrix $P'''_{i,k}$ and eigenvalue matrix $\Lambda_{i,k+1}$ can be carried out as described in [RD02] and [RD03]:

$$\Lambda'_{i,k} + \tau \cdot |\vec{Z}_{i,k}|^2 \cdot \frac{\vec{Z}_{i,k}}{|\vec{Z}_{i,k}|} \cdot \frac{\vec{Z}^T_{i,k}}{|\vec{Z}_{i,k}|} = P'''_{i,k} \cdot \Lambda_{i,k+1} \cdot P'''^T_{i,k} \quad [E31]$$

Inserting this eigendecomposition into [E28] yields:

$$R_{i,k+1} = P''_{i,k} \cdot [P'''_{i,k} \cdot \Lambda_{i,k+1} \cdot P'''^T_{i,k}] \cdot P''^T_{i,k} \quad [E32]$$

$$= P''_{i,k} \cdot P'''_{i,k} \cdot \Lambda_{i,k+1} \cdot P'''^T_{i,k} \cdot P''^T_{i,k}$$

$$= P_{i,k+1} \cdot \Lambda_{i,k+1} \cdot P^T_{i,k+1}$$

where:

$$P_{i,k+1} = P''_{i,k} \cdot P'''_{i,k} \quad [E33]$$

This last step completes the transition of the initially explicit eigendecomposition process of the correlation matrix R into a recursive process.

PCA Algorithm: Recursive Approach

The PCA transformation is implemented as a recursive algorithm and performed such that:
Potentially correlated input variables are transformed into uncorrelated, orthogonal output variables.
The output variables are ordered according to their variance in such a way that the first principal component has the largest possible variance.
Using the formulas from the previous step above, the eigenpairs—contained in the combination of orthogonal eigenvector matrix $P_{i,k+1}$ and diagonal eigenvalue matrix $\Lambda_{i,k+1}$—can be updated in an iterative manner using the eigenpairs of the previous epoch $t_k$ (i.e. $P_{i,k}$ and $\Lambda_{i,k}$) and the metrics $\vec{X}_{i,k+1}$ and $\Delta \vec{\mu}_{i,k+1}$ from the current epoch $t_{k+1}$.

PCA Algorithm: Initial Eigendecomposition for the Recursive Approach

For the recursive algorithm to work an initial orthogonal eigendecomposition of the correlation matrix R at epoch $t_1$ is necessary:

$$R_{i,1} = P_{i,1} \cdot \Lambda_{i,1} \cdot P_{i,1}^T \quad [E34]$$

This initial eigendecomposition can either be done batch-wise for a plurality of initial time epochs or offline from a long set of signal deformation fault-free measurements and then configured.

PCA Algorithm: Determination of Signal Deformation Monitor Test Metric SQM (Signal Quality Monitor) from Principal Components Using the principal components matrix PC (also called loading matrix) in form of the M eigenvectors $\vec{v}_{m,i,k+1}$ (with m=1, . . . , M) of $P_{i,k+1}$, sorted from large to small based on their corresponding eigenvalues $\lambda_{m,i,k+1}$, the normalized and bias-removed measurement vector at epoch $t_{k+1}$, i.e. $\vec{X}_{i,k+1}$, can be transformed from the original space of variables to a new space of variables, which are uncorrelated over the dataset in the signal deformation fault-free case:

$$\vec{T}_{i,k+1} = PC^T_{i,k+1} \cdot \vec{X}^T_{i,k+1} = \begin{bmatrix} \vec{v}^T_{largest,i,k+1} \\ \vdots \\ \vec{v}^T_{smallest,i,k+1} \end{bmatrix} \cdot \vec{X}^T_{i,k+1} \quad [E35]$$

However, not all the principal components need necessarily to be kept. It is possible to perform a dimensionality reduction by keeping only the first few largest principal components.

The signal deformation monitor test metric SQM at epoch $t_{k+1}$ is finally determined as square sum of the entries of vector $\vec{T}_{i,k+1}$, where $\vec{T}_{i,k+1}$ has been determined using either all M principal components or at least those with the two largest eigenvalues:

$$SQM_{i,k+1} = \vec{T}_{i,k+1}^T \cdot \vec{T}_{i,k+1} = \vec{X}_{i,k+1} \cdot PC_{i,k+1} \cdot PC_{i,k+1}^T \cdot \vec{X}_{i,k+1}^T \quad [E36]$$

The test metric $SQM_{i,k+1}$ follows a $\chi^2$ distribution and indicates the absolute deviation of the new samples from the nominal condition.

Signal Quality Monitor (SQM) Test Decision

Since the test statistic SQM follows a $\chi^2$ distribution the signal deformation monitor test is a one-sided test.

If the satellite status prior to the signal deformation monitoring is OK and the following inequality holds $$SQM_{i,n} > THR \quad [E37]$$

where:
$SQM_{i,n}$=signal quality monitor test metric for satellite i at measurement time epoch $t_n$,
THR=the predefined monitor threshold.
the code signals of satellite i received at all GNSS receivers are determined to be unsuitable for position determination and are excluded.

5. CONCLUSION

In conclusion, the present invention proposes a test metric for GNSS code signals received at GNSS receivers, wherein for each satellite i, a signal sent by that satellite i is received at the different GNSS receivers, and bias-removed, averaged over the receivers and normalized measurement values are derived out of autocorrelation function values from the received GNSS code signals, wherein a correlation matrix $R_{i,n}$ is built from a matrix $X_{i,n}$ containing the measurement values in the form of measurement value vectors $\vec{X}_{i,k}$ from the present time epoch $t_n$ and from previous time epochs $t_k$ with k=1, ..., n−1, wherein a principal component analysis is done of matrix $R_{i,n}$, wherein a transformed vector $\vec{T}_{i,n} = PC_{i,n}^T \cdot \vec{X}_{i,n}^T$ is calculated, with $PC_{i,n}$ containing at least two eigenvectors belonging to eigenpairs having the largest eigenvalues of all eigenpairs, wherein a signal quality monitor test metric $SQM_{i,n}$ is built from the square sum of the entries of transformed vector $\vec{T}_{i,n}$, and wherein if $SQM_{i,n}$ is larger than a threshold THR, the signals of satellite i are disallowed for position determination at all GNSS receivers. The invention allows monitoring GNSS code signals with respect to satellite signal deformation with an improved integrity and continuity.

6. References

[AD01] ICAO Annex 10 to the Convention on International Civil Aviation—
Aeronautical Telecommunications, Volume I, Radio Navigation Aids, (including Amendment 89). 999 University Street, Montreal, Quebec, Canada H3C 5H7, November 2012

[AD02] Akos, D. M., Phelts, R. E., Mitelman, A., Pullen, S., and Enge, P., "GPS-SPS Signal Quality Monitoring (SQM)," Position, Location and Navigation Symposium, Conference Proceedings Addendum, 2000 IEEE, San Diego, Calif., March 2000.

[AD03] Mitelman, A. M., Phelts, R. E., Akos, D. M., Pullen, S. P., and Enge, P. K., "Signal Deformations on Nominally Healthy GPS Satellites," Proceedings of the 2004 National Technical Meeting of The Institute of Navigation, San Diego, Calif., January 2004, pp. 0-0

[AD04] R. E. Phelts, D. Akos, P. Enge, "Robust Signal Quality Monitoring and Detection of Evil Waveforms," Proceedings of ION GPS 2000, Salt Lake City, Utah, Sep. 19-22, 2000, pp. 1180-1190

[AD05] Phelts, R. Eric, "Toward Real-Time SQM for WAAS: Improved Detection Techniques", Proc. ION GPS/GNSS 2003, 9-12 Sep. 2003, Portland, Oreg., pp. 2739-2749

[AD06] F. Liu, M. Brenner, C. Y. Tang, "Signal Deformation Monitoring Scheme Implemented in a Prototype Local Area Augmentation System Ground Installation," Proc. ION GNSS 2006, Fort Worth, Tex., Sep. 26-29, 2006, pp. 367-380

[AD07] G. B. Kaplan, O. Içoglu, A. B. Yoldemir, and M. Sezgin, "Real-time object detection using dynamic principal component analysis," in Proc. XIII Int. Conf. Ground Penetrating Radar, Lecce, Italy, June 2010, pp. 369-374

[AD08] J. Rife, Pratap Misra: "Impact of Time-Correlation of Monitor Statistic on Continuity of Safety-Critical Operations" Proceedings of the 24th International Technical Meeting of the Satellite Division of The Institute of Navigation, Portland, Oreg., Sep. 19-23, 2011, pp. 303-315

[AD09] EP 1 332 378 B1

[RD01] S. J. Qin, W. Li, and H. Yue, "Recursive PCA for adaptive process monitoring", in World Congress of the International Federation of Automatic Control, pp. 85-90, 1999

[RD02] Bunch, J. R., Nielsen, C. P., Sorensen, D. C.: "Rank one modification of the symmetric eigenproblem", in Numerische Mathematik, Volume 31, pp. 31-48 (1978)

[RD03] Gu, M. and Eisenstat, S., "A stable and efficient algorithm for the rank-one modification of the symmetric eigenproblem". SIAM Journal on Matrix Analysis and Applications, 1994, Vol. 15, No. 4, pp. 1266-1276

What is claimed is:

1. A method for operating a plurality of GNSS (Global Navigation Satellite System) receivers, wherein for position determination, the GNSS receivers receive GNSS code signals belonging to signals sent from a multitude of satellites, and wherein each received GNSS code signal is correlated with a reference code signal generated by the receiving GNSS receiver to obtain an autocorrelation function ($ACF^{obs}$), wherein a multitude of function values of the autocorrelation function ($ACF^{obs}$) at different discrete chip spacings are analyzed and used in obtaining a test metric, wherein using the test metric, a decision is made whether the received GNSS code signals are suitable for position determination or unsuitable for position determination due to satellite signal deformation, and wherein the GNSS code signals found unsuitable for position determination are excluded from position determination, wherein for each satellite i, with i being a satellite index, using the test metric includes the following steps:

a) for each time epoch $t_k$ in which the GNSS receivers receive GNSS code signals belonging to the signal of the same carrier frequency sent from the satellite i, forming a vector $\vec{X}_{i,k}$ of measurement values $X_{m,i,k}$, with m being a chip spacing index, and k being a measurement time epoch index, and the respective measurement value $X_{m,i,k}$ being derived from normalized and bias-removed function values of the autocorrelation functions ($ACF^{obs}$) of the GNSS code signals received at the GNSS receivers, combined for a multitude of the GNSS receivers;

b) obtaining the correlation matrix $R_{i,n}$ at time epoch $t_n$ from the epoch-wise measurement value vectors $\vec{X}_{i,k}$ obtained over a plurality of n time epochs $t_k$ with k=1, ..., n, with n being a monitoring time epoch index, which results in matrix $$X_{i,n} = \begin{bmatrix} \vec{X}_{i,1} \\ \vdots \\ \vec{X}_{i,n} \end{bmatrix},$$

in particular with $R_{i,n} \sim X^T_{i,n} X_{i,n}$ with $X^T_{i,n}$ being the transpose matrix of $X_{i,n}$;

c) doing a principal component analysis on correlation matrix $R_{i,n}$, thus obtaining an eigendecomposition of matrix $R_{i,n}$ into a multitude of eigenpairs, being pairs of eigenvector and eigenvalue;

d) calculating for time epoch $t_n$ a signal quality monitor test metric $SQM_{i,n}$ by transforming vector $\vec{X}_{i,n}$ to vector $\vec{T}_{i,n}$ via multiplication with principal component matrix $PC_{i,n}$ (160) and forming the square sum of vector $\vec{T}_{i,n}$'s entries, wherein $PC_{i,n}$ contains at least two eigenvectors of $R_{i,n}$, with the eigenvectors chosen having the largest eigenvalues of all eigenpairs;

e) comparing $SQM_{i,n}$ to a predefined threshold value THR, and if $SQM_{i,n}$ exceeds THR, the entirety of GNSS code signals received at all GNSS receivers belonging to the signal of the same carrier frequency sent by satellite i in time epoch $t_n$ are considered unsuitable for position determination due to satellite signal deformation;

wherein for subsequent time epochs having passed, the signal quality monitor test metric $SQM_{i,n}$ is determined again, with n increasing by 1 for each time epoch having passed.

2. The method according to claim 1, wherein in step a), a respective measurement value $X_{m,i,k}$ is derived from one function value at a particular chip spacing, combined for said multitude of GNSS receivers.

3. The method according to claim 1, wherein in step a), a respective measurement value $X_{m,i,k}$ is derived from a combination of function values of different chip spacings, in particular from a difference of function values of two neighboring chip spacings, combined for said multitude of GNSS receivers.

4. The method according to claim 1, wherein at least for some time epochs $t_n$, in particular later time epochs $t_n$, in step b) and c), obtaining the correlation matrix $R_{i,n}$ and the principal component analysis is done recursively, taking into account eigenpairs obtained for a previous time epoch for the same satellite i.

5. The method according to claim 4, wherein in an expression for calculating the correlation matrix $R_{i,n}$ recursively, a forgetting factor τ is applied, such that the older a time epoch $t_k$, the less it contributes to the expression for calculating the correlation matrix $R_{i,n}$, wherein the forgetting factor performs an exponential weighting with respect to time.

6. The method according to claim 1, wherein at least for some earlier time epochs $t_n$ in step c), the principal component analysis is done for the respective correlation matrix $R_{i,n}$ for a plurality of time epochs $t_k$ with k=1 ... n in common, where $R_{i,n}$ is calculated with $R_{i,n}=1/(n-1)* X^T_{i,n} X_{i,n}$, with n being the number of measurement epochs since algorithm initialization and $X^T_{i,n}$ being the transpose matrix of $X_{i,n}$.

7. The method according to claim 1, wherein in step a), the respective measurement values $X_{m,i,k}$ are derived from normalized and bias-removed function values of the autocorrelation functions ($ACF^{obs}$) of the GNSS code signals received at the GNSS receivers, averaged over the multitude of the GNSS receivers.

8. The method according to claim 1, wherein in step a), for forming the measurement values $X_{m,i,k}$ of vector $\vec{X}_{i,k}$, the function values of the autocorrelation function ($ACF^{obs}$) undergo said bias removal, taking into account corresponding function values of an autocorrelation function that would result from a GNSS code signal received at receiver j affected only by expected signal deformation, in particular caused by satellite hardware ($satBias_{m,i}$) and/or receiver hardware ($\eta_{m,j,k}$) and/or signal processing, thus obtaining per GNSS receiver j a vector $\vec{p}_{i,j,k}$ of difference values $\bar{p}_{m,i,j,k}$ for each time epoch $t_k$ and each satellite i.

9. The method according to claim 7, wherein in step a), for forming the measurement values $X_{m,i,k}$ of vector $\vec{X}_{i,k}$, the function values of the autocorrelation function ($ACF^{obs}$) undergo said bias removal, taking into account corresponding function values of an autocorrelation function that would result from a GNSS code signal received at receiver j affected only by expected signal deformation, in particular caused by satellite hardware ($satBias_{m,i}$) and/or receiver hardware ($\mu_{m,j,k}$) and/or signal processing, thus obtaining per GNSS receiver j a vector $\vec{p}_{i,j,k}$ of difference values $\bar{p}_{m,i,j,k}$ for each time epoch $t_k$ and each satellite i, and further said averaging is done over a set of at least 2 GNSS receivers on the difference values $\bar{p}_{m,i,j,k}$ of the vector $\vec{p}_{i,j,k}$, thus obtaining a vector $\vec{p}_{i,k}$ of averaged values $\bar{p}_{m,i,k}$.

10. The method according to claim 9, wherein in step a), for forming the measurement values $X_{m,i,k}$ of vector $\vec{X}_{i,k}$, said averaging is done over a set of at least 5 GNSS receivers on the difference values $\bar{p}_{m,i,j,k}$ of the vector $\vec{p}_{i,j,k}$, thus obtaining a vector $\vec{p}_{i,k}$ of averaged values $\bar{p}_{m,i,k}$.

11. The method according to claim 9, wherein in step a), for forming the measurement values $X_{m,i,k}$ of vector $\vec{X}_{i,k}$, said averaging is done over a set of at least 7 GNSS receivers on the difference values $\bar{p}_{m,i,j,k}$ of the vector $\vec{p}_{i,j,k}$, thus obtaining a vector $\vec{p}_{i,k}$ of averaged values $\bar{p}_{m,i,k}$.

12. The method according to claim 9, wherein in step a), for forming the measurement values $X_{m,i,k}$ of vector $\vec{X}_{i,k}$, said normalization is done on the vector $\vec{p}_{i,k}$ of averaged values $\bar{p}_{m,i,k}$ by dividing the averaged values $\bar{p}_{m,i,k}$ with the 1-sigma standard deviations $\sigma_m$ of Gaussian normal distributions describing the noise distribution in the fault-free case, thus obtaining the measurement values $X_{m,i,k}$ of vector $\vec{X}_{i,k}$.

13. The method according to claim 1, wherein the correlation matrix $R_{i,n}$ is built on smoothed function values where the smoothing is achieved by a noise reduction process based on low pass-filtering.

14. The method according to claim 1, wherein in step d), matrix $PC_{i,n}$ is based on all eigenvectors of $R_{i,n}$.

15. The method according to claim 1, wherein the chip spacing index m contains at least 3 chip spacings.

16. The method according to claim 1, wherein the chip spacing index m contains at least 5 chip spacings.

17. The method according to claim 1, wherein the chip spacings of the autocorrelation function values used in obtaining the test metric are chosen predominantly on the late side.

18. The method according to claim 1, wherein in step e), if $SQM_{i,n}$ exceeds THR in a time epoch $t_n$ for satellite i, the entirety of GNSS code signals received at all GNSS receivers belonging to signals of the same carrier frequency sent by the same satellite i in a number of subsequent time epochs are considered unsuitable for position determination due to satellite signal deformation, too.

19. A set of GNSS receivers, adapted for performing a method according to claim 1.

* * * * *

UNITED STATES PATENT AND TRADEMARK OFFICE
CERTIFICATE OF CORRECTION

PATENT NO. : 11,409,002 B2
APPLICATION NO. : 16/530349
DATED : August 9, 2022
INVENTOR(S) : Sébastien Bomart et al.

It is certified that error appears in the above-identified patent and that said Letters Patent is hereby corrected as shown below:

In the Specification

In the Description

Column 6, Line 41, " $\vec{\overline{P}}_{i,j,k}$ " should read -- $\vec{\overline{\overline{p}}}_{i,j,k}$ --.

Column 6, Line 42, " $\vec{\overline{P}}_{m,i,j,k}$ " should read -- $\vec{\overline{\overline{p}}}_{m,i,j,k}$ --.

Column 6, Line 53, " $\vec{\overline{P}}_{m,i,j,k}$ " should read -- $\vec{\overline{\overline{p}}}_{m,i,j,k}$ --.

Column 6, Line 55, " $\vec{\overline{P}}_{i,j,k'}$ " should read -- $\vec{\overline{\overline{p}}}_{i,j,k'}$ --.

Column 6, Line 55, " $\vec{\overline{P}}_{i,k}$ " should read -- $\vec{\overline{\overline{p}}}_{i,k}$ --.

Column 6, Line 61, " $\vec{\overline{P}}_{i,k}$ " should read -- $\vec{\overline{\overline{p}}}_{i,k}$ --.

In the Detailed Description of the Preferred Embodiments

Column 13, Line 65, " $\vec{\overline{P}}_{m,i,j,k} \vec{\overline{P}}_{m,i,j,k} \mu_{m,j,k}$ " should read -- $\overline{\overline{p}}_{m,i,j,k} = \overline{p}_{m,i,j,k} - \mu_{m,j,k}$ --.

Signed and Sealed this
Sixth Day of December, 2022

*Katherine Kelly Vidal*

Katherine Kelly Vidal
*Director of the United States Patent and Trademark Office*

CERTIFICATE OF CORRECTION (continued)
U.S. Pat. No. 11,409,002 B2

Column 18, Line 56, "$(1-\tau)\cdot\Lambda_{i,k}+\overrightarrow{\overline{\mu}}_{i,k}\cdot\overrightarrow{\overline{\mu}}^T_{i,k}$" should read
--$(1-\tau)\cdot\Lambda_{i,k}+\vec{\bar{\mu}}_{i,k}\cdot\vec{\bar{\mu}}^T_{i,k}$--.

In the Claims

Column 23, Claim 8, Line 53, "($\eta_{m,j,k}$)" should read --($\mu_{m,j,k}$)--.

Column 23, Claim 8, Line 55, "$\overrightarrow{\overline{p}}_{i,j,k}$" should read --$\vec{\bar{p}}_{i,j,k}$--.

Column 23, Claim 8, Line 56, "$\overrightarrow{\overline{p}}_{m,i,j,k}$" should read --$\vec{\bar{p}}_{m,i,j,k}$--.

Column 24, Claim 9, Line 7, "$\overrightarrow{\overline{p}}_{i,j,k}$" should read --$\vec{\bar{p}}_{i,j,k}$--.

Column 24, Claim 9, Line 7, "$\overrightarrow{\overline{p}}_{m,i,j,k}$" should read --$\vec{\bar{p}}_{m,i,j,k}$--.

Column 24, Claim 9, Line 11, "$\overrightarrow{\overline{p}}_{i,j,k'}$" should read --$\vec{\bar{p}}_{i,j,k'}$--.

Column 24, Claim 9, Line 13, "$\overrightarrow{\overline{p}}_{i,k}$" should read --$\vec{\bar{p}}_{i,k}$--.

Column 24, Claim 9, Line 13, "$\overrightarrow{\overline{p}}_{m,i,k}\cdot$" should read --$\vec{\bar{p}}_{m,i,k}\cdot$--.

Column 24, Claim 10, Line 18, "$\overrightarrow{\overline{p}}_{i,j,k'}$" should read --$\vec{\bar{p}}_{i,j,k'}$--.

Column 24, Claim 10, Line 19, "$\overrightarrow{\overline{p}}_{i,k}$" should read --$\vec{\bar{p}}_{i,k}$--.

Column 24, Claim 10, Line 19, "$\overrightarrow{\overline{p}}_{m,i,k}\cdot$" should read --$\vec{\bar{p}}_{m,i,k}\cdot$--.

CERTIFICATE OF CORRECTION (continued)
U.S. Pat. No. 11,409,002 B2

Column 24, Claim 11, Line 23, "$\overrightarrow{\overline{\mathrm{P}}}_{i,j,k}$" should read --$\vec{\bar{\bar{p}}}_{i,j,k}$--.

Column 24, Claim 11, Line 25, "$\overrightarrow{\overline{\mathrm{P}}}_{i,k}$" should read --$\vec{\bar{\bar{p}}}_{i,k}$--.

Column 24, Claim 12, Line 29, "$\overrightarrow{\overline{\mathrm{P}}}_{i,k}$" should read --$\vec{\bar{\bar{p}}}_{i,k}$--.

Column 24, Claim 12, Line 30, "$\overline{P}_{m,i,k}$" should read --$\bar{\bar{p}}_{m,i,k}$--.